INVENTOR.
WALTER W. LEE
BY
Constantine A. Michalos
ATTORNEY

INVENTOR.
WALTER W. LEE
BY
Constantine A. Michalos
ATTORNEY

United States Patent Office 3,341,692
Patented Sept. 12, 1967

3,341,692

SOLID STATE NON-ERASABLE OPTICAL MEMORY SENSING SYSTEM

Walter W. Lee, Allendale, N.J., assignor to The Bendix Corporation, Eclipse-Pioneer Division, Teterboro, N.J., a corporation of Delaware

Filed Dec. 12, 1963, Ser. No. 330,098
3 Claims. (Cl. 235—61.11)

ABSTRACT OF THE DISCLOSURE

A solid state non-erasable optical memory system in a sandwich type structure provided with two sections; an information section including an electroluminescent panel and a coded information mask placed at one side of a first series of parallel closely spaced transparent electrical conductors extending in an X-axis direction, the first series of conductors having signal voltages selectively applied thereto by an input signal address selector; and a read-out section at an opposite side of the first series of conductors including a second series of closely spaced electrical conductors extending in a Y-axis direction transverse said first series of conductors and in spaced relation thereto, and a single photoconductive panel interposed between the first and second series of conductors with opposite sides of the photoconductive panel in contacting relation with the first and second series of conductors in an arrangement in which the coded information mask may be selectively replaced by a mask providing different coded information thereon, the mask being of an opaque material with a plurality of coded micro apertures or transparent areas through which light rays from the electroluminescent panel may be directed so as to pass through the first series of transparent conductors and selectively illuminate the photoconductive panel at points corresponding to predetermined spaced intersections of the first and second series of transverse conductors, and said light rays providing a reduced resistance of said photoconductor panel at said illuminated points corresponding to said predetermined spaced intersections to permit electrical conduction of the signal voltages through the photoconductor panel at said illuminated points between said first and second series of conductors, and including in the read-out section and output signal computer means responsive to the signal voltages applied to the second series of conductors through said illuminated conduction points to read out the predetermined intersections and thereby the coded information presented by the effective coded information mask.

This invention relates to memory systems, and particularly to a random access solid state non-erasable optical memory system.

Optical memory systems, by making use of the higher resolution inherent in micro-photographic process, achieve a storage density several orders of magnitude higher than that obtainable by magnetic drums. This invention provides for a read-out section of a series of parallel closely spaced electrical conductors extending in a Y-axis direction, a series of closely spaced transparent electrical conductors extending in the X-axis direction, and a photoconductive element interposed between the Y-axis conductors and the X-axis conductors. In addition, it provides for an information section placed adjacent the read-out section, comprising an illuminating source such as an electroluminescent panel placed on the transparent X-axis conductors' side with an information mask interposed therebetween for supplying coded information to the read-out section. The coded information mask, made of opaque material with bits of transparent micro-photographic information segments, is removably insertable between the transparent X-axis conductors and the electroluminescent panel in order that it may be interchanged with other coded information masks. The whole unit may then be physically encased in a housing and electrically interconnected to provide a novel random access solid state non-erasable optical memory system as hereinafter more fully described.

An object of the present invention is to provide a memory system having an extremely low volume and negligible access time.

Another object of this invention is to provide an optical memory system having low power requirements and readily interchangeable stored information.

A further object of this invention is to provide a network of a series of parallel conductors extending in the Y-axis direction and a series of parallel transparent conductors extending in the X-axis direction, a photoconductor interposed therebetween for receiving illuminated bits of information directed by an electroluminescent panel through a removable coded mask to provide therewith an optical path, providing a conductive electrical continuity for an electrical path for reading said information.

A further object of this invention is to provide a memory system having predetermined desired information in the form of a film with a series of transparencies or apertures and opaque areas corresponding to the "zeros" and "ones" of the binary system, the desired information being micro-photographed or etched on the film to provide a storage capacity in the range of one-half to one million bits of information per square inch of matrix area.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figures 1, 2:
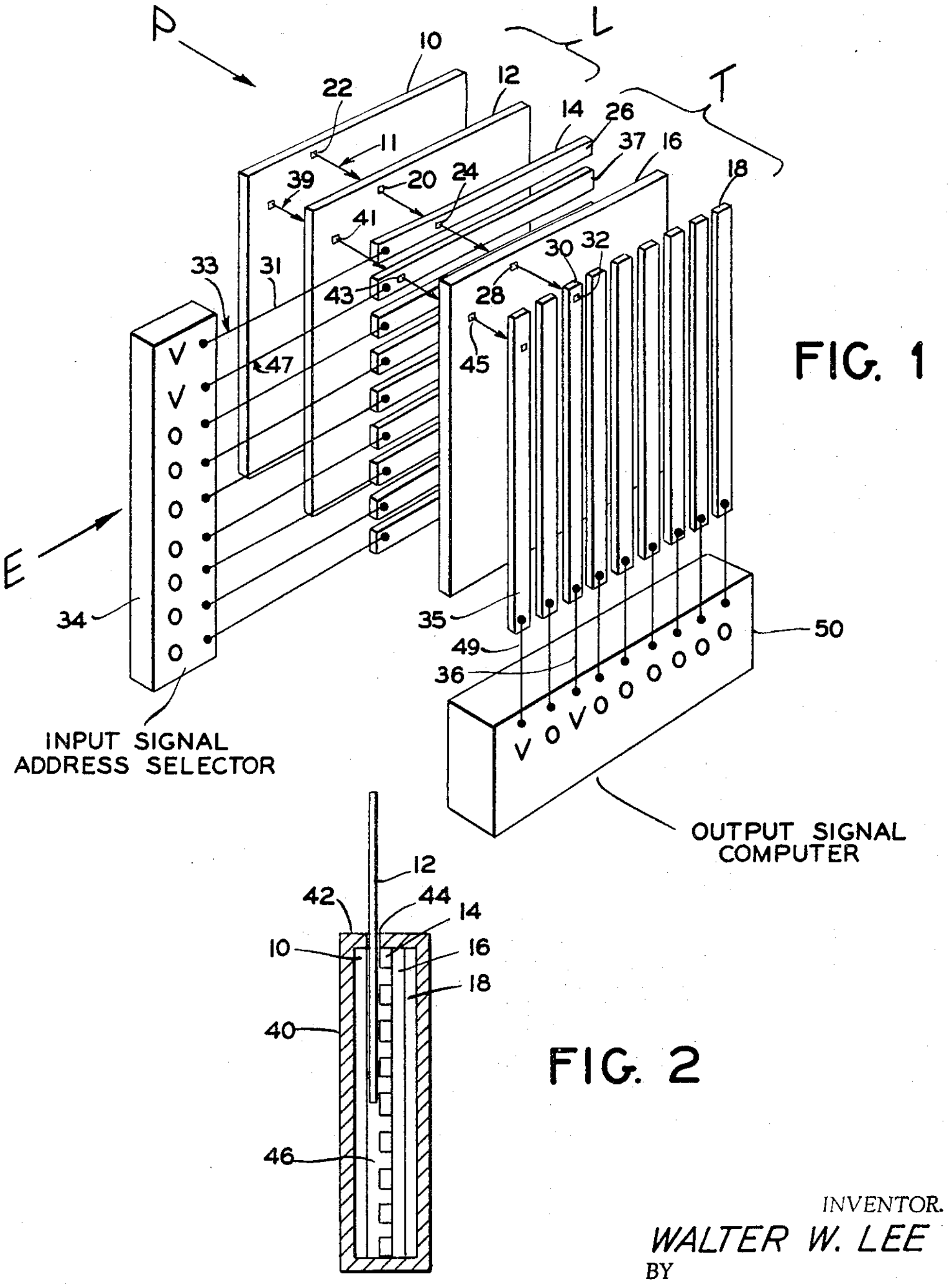
FIGURE 1 is a schematic of an exploded perspective view of the memory device in accordance with a preferred embodiment of the invention.
FIGURE 2 is a side view partly in section of the device shown in FIGURE 1 but in an assembled position.

Referring now to the drawing in detail, it will be seen that the optical memory system is a sandwich type structure provided with two sections, an information section L and a read-out section T with two separate paths, a first path such as an optical path P and a second path such as an electrical path E. The first path comprises a means of optically sensing a predetermined signal and the second path provides for an electric conversion of the signal of the first path. That is, depending on a predetermined pattern, the optical or first path provides for a so-called switching means to energize the electrical or second path.

Referring particularly to the structure found in the optical path P, it will be seen that the memory system physically comprises a plurality of sandwiched optically coupled paneled sections arranged in cooperative electrical relation. The sections primarily comprise a suitable light source, such as any well known electroluminescent phosphor embedded panel 10, an information coding element such as a matrix or mask 12, a first series of parallel closely spaced transparent electrical conductors 14 extending in the X–axis direction, a photoconductive panel 16, and a second series of parallel closely spaced electrical conductors 18, extending in the Y-axis direction.

In detail, the information mask 12 comprises an opaque panel having a plurality of coded apertures or transparent areas 20 through which light can be directed from the electroluminescent panel. The pattern of the apertures or transparent areas on the mask depends upon the particular code being used. The location and number of the opaque and transparent areas represent the bits of information, such as the "ones" and the "zeros" of the binary system. This pattern is illuminated by the light produced by the electroluminescent panel 10. Adjacent to the mask is provided the two series of conductors, the series of X-axis conductors providing the source of voltage signal, and the Y-axis conductor series providing the means for receiving the voltage signal. The transparent X-axis conductors may be fabricated of transparent conductive material such as glass coated with a conductive paint of any well known material, such as gold. These conductors might be spaced at a sufficient density to be employed with the mask to provide a range of one-half to one million bits of information. The photoconductive panel 16 may be of a transparent fluid coating which is laid down over the entire surface of the X-axis transparent conductors 14. On the other side of the photoconductive material there is laid the other series of parallel closely spaced Y-axis conductors 18 extending transversely to the first conductors. It will be seen from FIGURE 2 of the drawing, that the photoconductive panel 16 is placed between the two series of conductors 14 and 18 in an electrical contacting relation therewith, and then the mask 12 is removably inserted between the electroluminescent panel 10 and the X-axis conductors 14.

It should be understood that photoconductive material in the dark has extremely high resistance to electric flow, usually measured in hundreds of megohms, but in bright light, its resistance falls to a very low value, approaching that of metallic conductors. Therefore, any light that is present on the electroluminescent panel will pass through the mask, where there is a transparent area, onto the layer of photoconductive material. There, the light will effectively reduce the resistance of the photoconductive material to reduce its resistance at those intersections where the transparent area is present. That is, the light will be absorbed by the photoconductive material, which was an insulator in the dark, and will penetrate it, from one side to the other to reduce its resistance to make it conductive. Thereby, the photoconductor 16 will electrically connect the X-axis conductor 14 to the Y-axis conductor 18 at that point of light penetration. At those intersections of the conductors where the area is opaque, the conductors will be electrically insulated. Therefore, due to the low resistance of the photoconductor 16 at the light penetration, a signal such as a voltage V, applied to one of the horizontal or X-axis conductors 14, will produce a voltage only on the vertical or Y-axis conductor 18 at the exact intersection behind the transparent areas 20 of the mask 12. It should also be noted that in order to prevent "sneak pass" or other forms of short circuiting, it may be necessary to lay down the photoconductive material in such a manner that it becomes a diode when in contact with one of the conductors. Another solution of the same problem is to use low impedance amplifiers and voltage sources, as this will prevent spurious voltages from being transmitted.

Referring to FIGURE 1, it should be understood that the information to be conveyed to the memory system is defined by the mask 12 by a plurality of apertures or transparent areas 20 which may be disposed in horizontal rows and vertical columns. The mask 12 may be fabricated from any suitable opaque materials such as exposed photographic film. That is, the transparent areas 20 of the mask 12 may be formed by covering the unexposed film with photographic or etched opaque bits of information, depending on the particular code being used, then when the film is exposed to light, the film will have opaque areas with transparent or clear openings 20 through which the light from the electroluminescent panel 10 may flow. Each of the bits of information will be separated from its neighbors by an opaque border produced by the exposure of that area to the light.

Referring again to FIGURE 1, a single optical path 11, shown as an increment of light 22 initiated at the light source or electroluminescent panel 10, is then directed through the aperture or transparent area 20 to a point 24 on the surface of a transparent conductor 26. Since the conductor is transparent, the light will travel through the conductor 26 to be impinged onto the photoconductor panel 16 at a pin point area 28. The light will then be absorbed by the photoconductor 16 only at the pin point area 28 to transform it into an electrical conductor. The conductors 14 and 18 being mechanically coupled to the photoconductive material 16, will provide an electrical continuity between the conductor 26 at point 24, through the photoconductor element 16 at point 28 and to a Y-axis conductor 30 at a point 32. Therefore, applying a voltage signal on an X-axis conductor 14 of a computer means which comprises an input signal address selector 34 through an output terminal 31, the voltage signal will travel through an electrical conductive path 33 through the conductor 26, to the point 24 into the photoconductive material 16 at the low resistance point 28. The signal will travel from the conductor 26 through the point 28 to the conductor 30 at point 32 and through the conductor 30 to appear as an output signal on a computer terminal 36. The computer means also comprise an output signal computer 50 which receives signals, such as the herein described voltage signal, and calculates these signals to reproduce them into readable output information.

Referring to FIGURE 2, a suitable opaque housing or casing 40 is shown for providing a shielding from stray ambient light and for supporting the electroluminescent panel 10, the X-axis transparent conductors 14, the photoconducting element 16 and the Y-axis conductors 18. At an end portion 42 of the casing, there is provided an elongated slot 44 in which the information mask 12 may be inserted to fit in a groove 46 between the electroluminescent panel 10 and the X-axis conductors 14. With this feature, any coded information mask 12 of the same size may be inserted to be read by the system.

Figure 3:
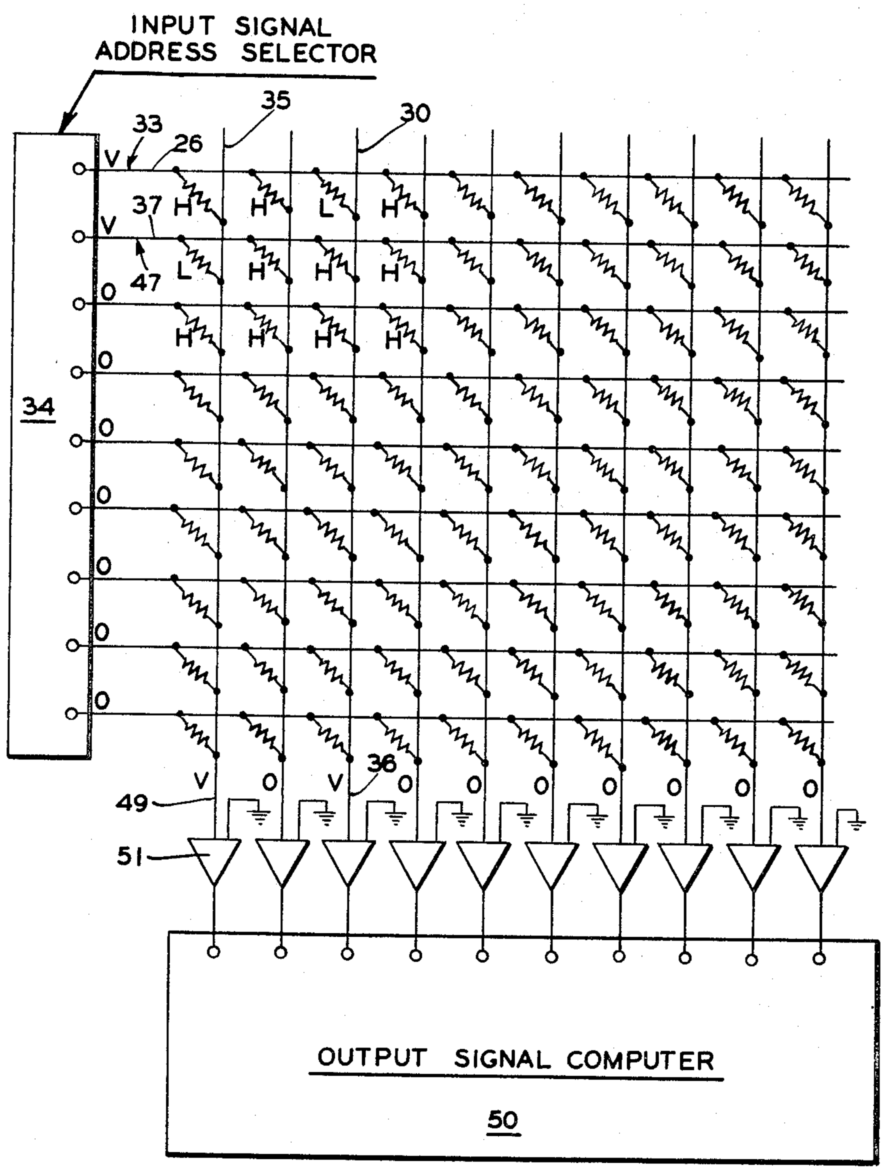
FIGURE 3 shows a schematic of the electric circuit arrangement of FIGURE 1.

Referring to FIGURE 3, a schematic electric circuit arrangement is shown representing the high resistance and the low resistance of the electrical conductor crossings. At the crossings of the X-axis conductors with the Y-axis conductors, where there is an opaque area on the information mask, where light from the electroluminescent panel will be shielded to prevent the lowering of the resistance of the photoconductor, there will be a high resistance crossing H. At the crossings of the X-axis conductors with the Y-axis conductors, where there is a transparent area on the information mask, where light from the electroluminescent panel will reach the photoconductor to lower the resistance of the photoconductor, there will be a low resistance crossing L. Therefore, when a signal V is applied to an X-axis conductor line, it will appear only on those Y-axis conductors where the crossings of the two are joined by a low resistance. That is, referring to both FIGURES 1 and 3, it can be seen that even though a signal is applied from the address selector 34 to the conductor 26, no signal will be sent through the electrical conductor path 33 to any of the Y-axis conductors except to the Y-axis conductor 30. For a Y-axis conductor, such as a conductor represented by the numeral 35, to receive a signal, the address selector 34 has to move its signal to a second transparent X-axis conductor 37 where a low resistance crossing L is produced by a light from the electroluminescent panel 10 being directed by an optical path 39 through a transparent area 41 of the mask 12 and the transparent conductor 37 at a point 43 to impinge on a pin point area 45 of the photoconductor 16. The signal V can then travel by an electrical path 47 to the point 43 on the conductor 37, through the pin point area 45 on the photoconductor 16, which has a low resistance due to the optical path 39, to the conductor 35 to appear on a computer terminal 49 to be subsequently utilized by the output signal computer 50 for reading the information supplied by the mask. It should be noted that the circuit shown in FIGURE 3, also illustrates a series of suitable amplifiers 51 that serve to amplify the V signal into the ocmputer 50, which, for simplification, is illustrated only in block form.

Therefore, in order to operate the optical memory system, a coded information mask to be read is placed within the groove 46 of the opaque casing 40 through the slot 44 of the assembled unit. The electroluminescent panel is then illuminated to direct a light onto the photoconductor panel 16 only through transparent areas such as 20 and 41. The transparent areas 20 and 41, representing a display of coded information on the mask 12, will be transferred to low resistance pin point areas such as 28 and 45 on the photocondutcor 16 by the electroluminescent light as hereinbefore described. A voltage is then sequentially switched by the address selector 34 from X-axis conductor 26 and X-axis conductor 37 to Y-axis conductors 30 and 35, respectively, in accordance with a predetermined speed to linearly scan all the X-axis conductors. When the voltage, representing a signal, is applied to the X-axis conductors 14, the signal will travel from the X-axis conductors 14 to the Y-axis 18 conductors only at the places of the low resistance.

The alteration of the stored information of the memory system is accomplished simply by replacing the information mask 12 with another coded mask 12. That is, all that has to be done is to physically remove the mask 12 from the casing 40 and insert therein another coded mask 12. In the dark, the conductor areas formed on the photoconductor 16 by the electroluminescent light being directed through the transparencies of the first mask 12 would fade out and the memory system would be ready to read the second mask 12 by the same operation just described. The electric switching pulses, from the coded transparencies, representing a binary information, will be utilized by the output signal computer 50 for reading out the output signal provided by the coded information in a manner well known in the art.

Therefore, the purpose of this invention is to provide a memory system to guide electrical signals from an input signal address selector 34 to be read by an output signal computer 50 by means of X-axis conductors 14 and Y-axis conductors 18 connected by a coded information means 12 having low resistance micro-areas produced on the photoconductor 16 by light from an electroluminescent lamp 10 directed through predetermined coded information transparencies formed on a mask 12 which is inserted between the electroluminescent lamp 10 and the conductors 14 and 18.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An optical high density memory system comprising a transparent electrical conductor extending in an X-axis direction, electrical conductors extending transversely to said transparent conductors along the Y-axis direction and placed in an adjacent spaced relation to said transparent conductors to form therewith a plurality of spaced intersections, a photoconductor panel interposed in an electrical contacting relation between said X-axis conductors and said Y-axis conductors and extending to cover substantially all of the spaced intersections of said X-axis and Y-axis conductors and physically contacting at opposite sides the X-axis and Y-axis conductors at said intersections, an electroluminescent panel adjacent said transparent conductors operable to supply a source of illumination, an information mask having micro-photographic transparent areas and opaque areas, denoting the binary system, said information mask being insertable between said electroluminescent panel and said transparent conductors, the transparent areas of said information mask selectively overlying intersections of said X-axis and Y-axis conductors according to a predetermined coded information matrix defined on said mask to permit light from said electroluminescent panel to be directed through said transparent areas to impinge onto said photoconductor panel to make said photoconductor panel electrically conductive at said areas to selectively connect said X-axis and Y-axis conductors, and a computer means operable to receive electrical signals applied to the Y-axis conductors through the selectively conductive areas at said intersections to thereby read the information of said mask.

2. The structure of claim 1 including an address selector for selectively switching a voltage signal onto the X-axis conductors for rendering effective each intersection along the X-axis conductors selectively connected to the Y-axis conductors through the photoconductor panel by the transparent areas of the information mask, and the computer means being responsive to the voltage signal thereby applied to the Y-axis conductors to read the transparent information areas presented by the mask onto the photoconductor panel.

3. The combination defined by claim 2 in which the optical memory system further comprises a casing for supporting said electroluminescent panel, said X-axis transparent electrical conductors, said photoconductor panel, and said Y-axis electrical conductors, said casing having a slot for receiving therein between saind electroluminescent panel and said X-axis conductors a removable information mask whereby the optical memory system is provided with means for rapidly changing the coded information of said mask by removing said information mask and selectively substituting therefor other information masks having different information coded thereon by other arrangements of the microphotographic transparent areas and opaque areas.

References Cited

UNITED STATES PATENTS

| | | | |
|---|---|---|---|
| 2,727,685 | 12/1955 | Wilson | 340—173 |
| 3,046,540 | 7/1962 | Litz | 340—173 |
| 3,145,368 | 8/1964 | Hoover | 340—173 |
| 3,201,764 | 8/1965 | Parker | 340—173 |
| 3,215,819 | 11/1965 | Smith | 340—173 |

TERRELL W. FEARS, *Primary Examiner.*